Aug. 22, 1967     D. L. PILE ET AL     3,336,917

APPARATUS FOR DETERMINING BONE STRUCTURE MISALIGNMENT

Filed Sept. 8, 1964     4 Sheets-Sheet 1

INVENTORS.
Donald L. Pile
Harold O. Irwin
BY Edgar W. Campbell

Hovey, Schmidt, Johnson & Hovey
ATTORNEYS.

INVENTORS.
Donald L. Pile,
Harold O. Irwin,
Edgar W. Campbell
BY Hovey, Schmidt, Johnson & Hovey
ATTORNEYS

United States Patent Office 3,336,917
Patented Aug. 22, 1967

3,336,917
APPARATUS FOR DETERMINING BONE
STRUCTURE MISALIGNMENT
Donald L. Pile, 5612 Avalon Lane, Topeka, Kans. 66604, Harold O. Irwin, Rossville, Kans., and Edgar W. Campbell, Gravois Mills, Mo.; said Irwin and said Campbell, assignors to said Pile
Filed Sept. 8, 1964, Ser. No. 394,920
16 Claims. (Cl. 128—2)

This invention relates to therapeutic apparatus for use in correcting misalignment or improper disposition of particular bone structure of a patient under treatment.

X-ray photography has for many years been in widespread use, one of its principal applications being to locate broken, deformed, or out-of-place bone structure. Although X-rays have proven to be highly satisfactory for this purpose and, in fact, have made a major contribution to medical science, the apparatus employed to photograph a patient is often quite expensive both in initial and operational costs. Practicing chiropractors and other professionals in the medical arts have frequent use for X-ray machines capable of photographing a major portion of the body with one exposure. In this manner, the entire pelvic region and the spine may be viewed as one continuous image, permitting a determination of whether or not particular bone structures of interest are in their proper relative positions. Due largely to the size of photographs such as these, the cost in obtaining each image is relatively high.

Additionally, when it is desired to ascertain the precise degree of misalignment of particular bone structure, X-ray photographs are limited in usefulness since the image so obtained is strictly a 2-dimensional representation of the structural condition actually existing in the patient. Chiropractors in particular are interested in learning the exact 3-dimensional positions of various skeletal features of a patient so that arch pads or heel lifts of proper thickness may be employed in the patient's shoes to correct any malpositioned bone structure. Heretofore, it has been necessary to utilize cut-and-try methods in forming heel and arch supports of proper dimensions since no true and accurate check on the malpositioned bone structure was available.

It is, therefore, the primary object of this invention to alleviate the problems discussed hereinabove by providing apparatus which does not rely on radiation photography as a means of furnishing the required data, and which also is less expensive in initial cost than X-ray apparatus and virtually cost-free from an operational standpoint.

It is another object of this invention to provide therapeutic apparatus which will indicate the degree of misalignment of malposition of selected skeletal features of a patient under treatment.

It is another object of this invention to provide therapeutic apparatus as aforesaid which receives the patient under treatment and raises the heels or arches of the patent to correct any misalignment or malpositioning indicated by the machine so that corrective arch or heel supports may subsequently be prepared and utilized in the shoes of the patient.

Still another object of the instant invention is to provide such therapeutic apparatus having measuring means for contacting the hip and back regions of the patient to determine whether or not any bone misalignment or malpositioning is present.

Yet another object of this invention is to provide therapeutic apparatus as aforesaid in which the measuring means contacts the hip regions of the patient, particularly the notch below the anterior-superior crest of the ilium, to determine if any superior-inferior difference or anterior-posterior difference exists between the two notches. Alternatively, it is a specific object of this invention to provide such measuring means that will measure the degree of pelvic angulation between one of the aforesaid notches and the first sacrotubercle.

Additionally, it is an object of this invention to provide therapeutic apparatus as aforesaid in which the measuring means is reciprocable along two orthogonal paths of travel, and in which the position of the patient may be shifted toward and away from the measuring means so that the latter and the patient may be brought into proper relationship.

Other objects will become apparent as the detailed description proceeds.

Briefly, the apparatus of the instant invention employs a reciprocable carrier having a platform thereon provided with an upstanding rest. In one mode of operation, the patient under treatment stands on the platform against the rest and is moved into association with a pair of spaced-apart measuring structures. Each of the structures is then positioned adjacent a corresponding hip region of the patient and is mounted for reciprocal movement both vertically and horizontally. Thus, each of the structures may be brought into contact with the respective notch below the anterior-superior crest of the ilium.

Indicating means responds to the movement of the measuring structures required to effect such contact, and indicates any relative movement of the two structures away from a predetermined, normal relative disposition corresponding to proper alignment of the two notches. Therefore, if these notches are in proper alignment there will be no relative movement of the measuring structures, but if an anterior-posterior or superior-inferior difference exists, then one structure will necessarily be shifted relative to the other in order to make proper contact with the notches and this will be reflected by the indicating means.

The indicating means of the apparatus is calculated in millimeters or other suitable units so that the chiropractor or physician will be made aware of the degree of deviation of the notches from the proper positions thereof. In this manner, a 3-dimensional representation of the relative positions of these major bone structures is given by the apparatus.

Misalignment of the bone structure in the hip regions of the patient will cause the spine to be disposed at a certain degree of angularity with respect to the proper position thereof relative to the hip regions. In aggravated cases of ilium misalignment, the spine often becomes quite malpositioned, resulting in a severe condition which should be corrected. Such correction can be effected through the use of arch and heel supports in the shoes of the patient which re-align the ilia and give the spine a proper support upon which to rest and commence natural return to its normal position.

The proper thickness of arch pads and heel lifts necessary to effect this re-alignment may be accurately ascertained by the instant invention due to the provision of supporting elements on the patient-receiving platform which underlie the arches and heels of the patient. These elements may be elevated above the platform by the operator of the apparatus to shift the hip regions back into proper relative positional relationship. Indicating dials are provided which register the height of the elements above the platform so that, once zero deviation of the ilia notches is attained, arch pads or heel lifts dimensioned to correct the condtion may be selected.

In another mode of operation of the instant invention, an angle-measuring device is attached to one of the measuring structures to measure the degree of pelvic angulation between the notch below the anterior-superior crest of the ilium and the first sacrotubercle. Here again, the supporting elements beneath the patient's feet are employed to adjust the angulation to the proper degree. Corrective arch or heel supports may then be utilized so that this degree of angulation will be maintained while the patient is on his feet. Manifestly, other skeletal features may be used as the reference points for these or other similar measurements which indicate any misalignment or malpositioning of bone structure injurious to health.

Figure 1:
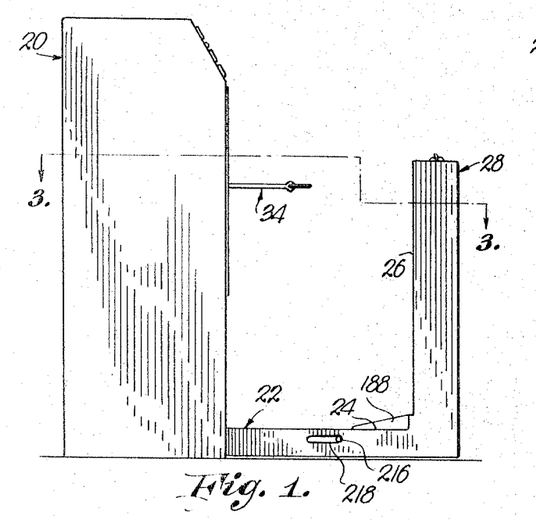
FIGURE 1 is a side elevational view of the apparatus.
Figure 2:
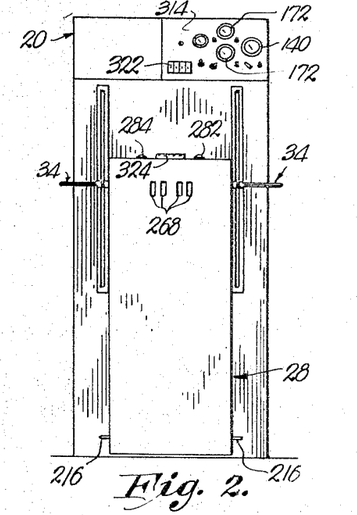
FIG. 2 is a front elevational view of the apparatus.
Figures 3, 12:
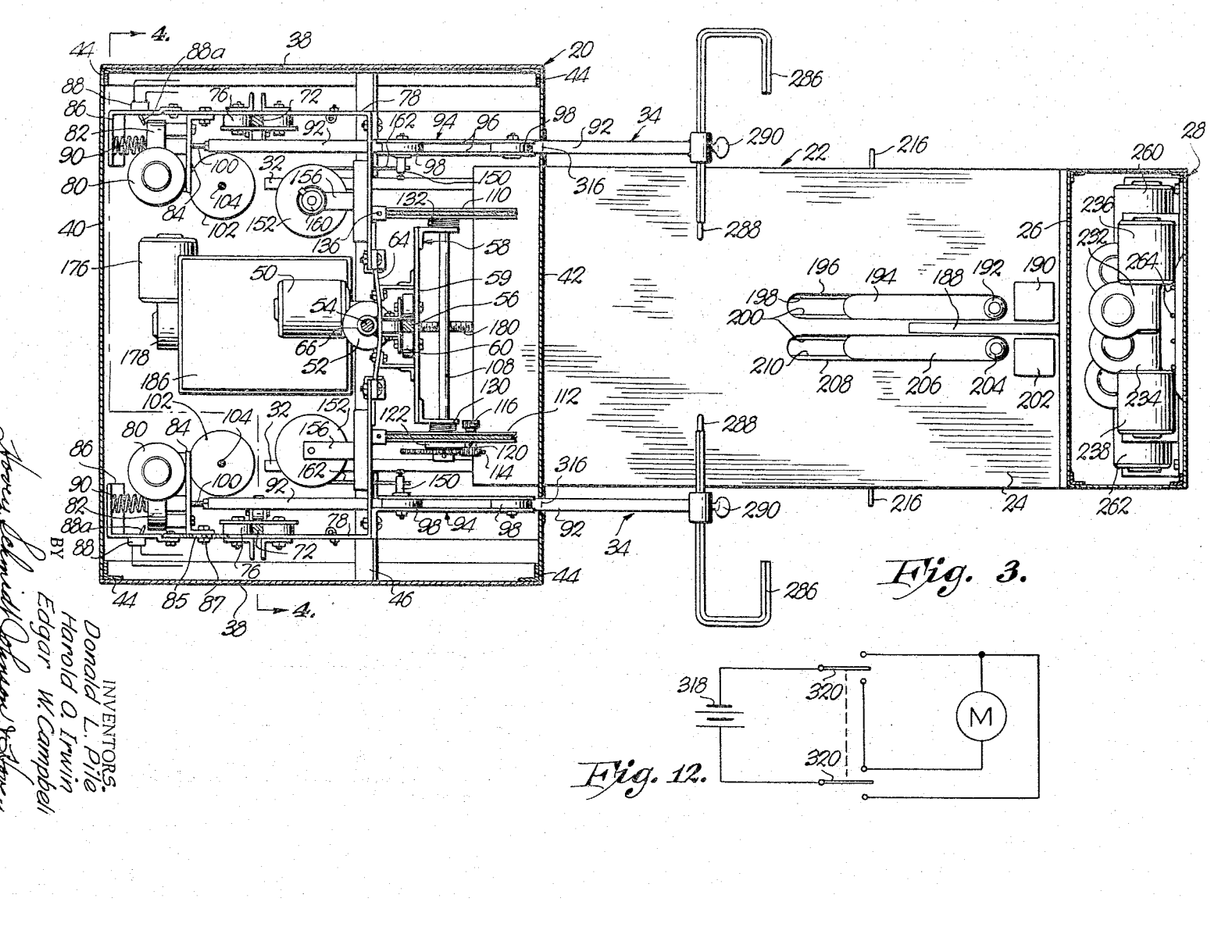
FIG. 3 is a horizontal, sectional view taken along line 3—3 of FIG. 1.
FIG. 12 is an electrical schematic diagram showing one of the drive motors and its associated control circuit.

Particular reference is first made to FIGS. 1, 2 and 3 which show an upstanding housing 20 in the form of a main console, and a carrier 22 having a horizontal, patient-receiving platform 24 provided with an upstanding rest 26, the latter and platform 24 serving as a support for the patient under treatment. Rest 26 forms one panel of a housing 28 in the form of a secondary console which is in horizontally spaced relationship to the main console 20.

Figures 4, 8, 9:
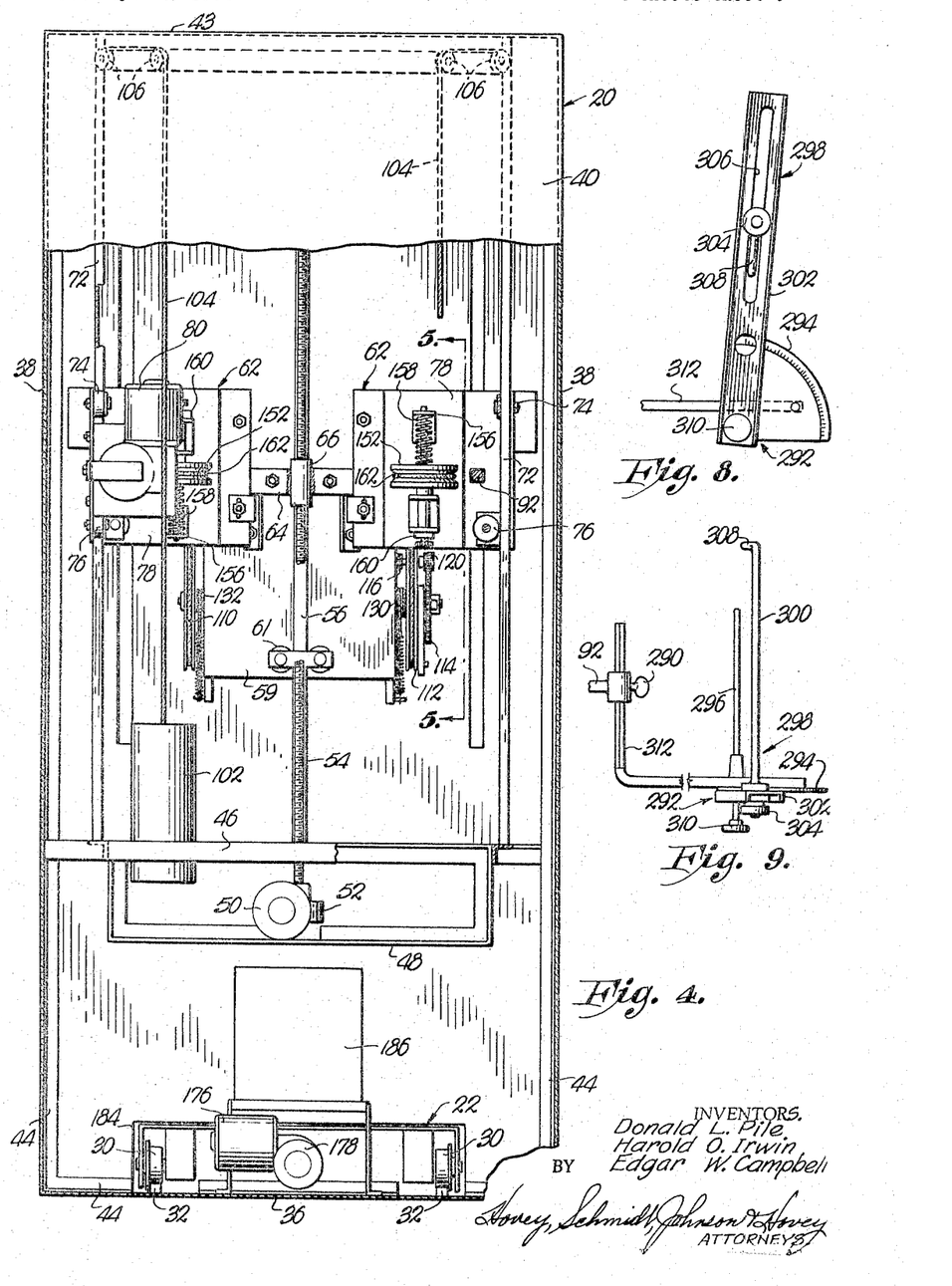
FIG. 4 is a vertical, sectional view taken along line 4—4 of FIG. 3.
FIG. 8 is an elevational, detailed view of the angle measuring attachment.
FIG. 9 is a plan view of the attachment shown in FIG. 8.
Figures 5, 6, 7:
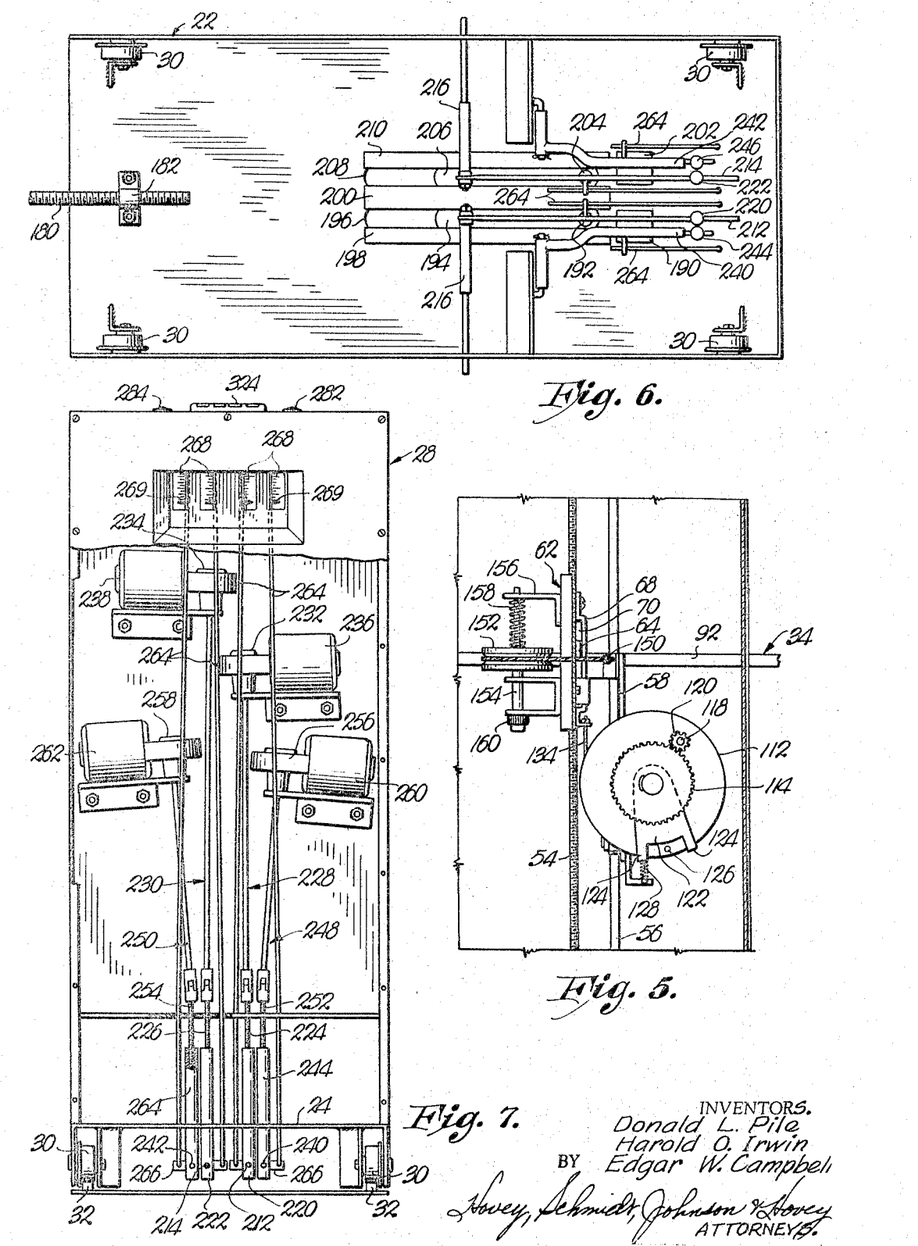
FIG. 5 is a fragmentary, vertical, sectional view taken along line 5—5 of FIG. 4.
FIG. 6 is a fragmentary, bottom view showing the carrier.
FIG. 7 is a front view of the secondary console, the front panel thereof being partially broken away to reveal details of construction.

Referring also to FIGS. 4, 6 and 7, it may be seen that carrier 22 is provided with rollers 30 which rest upon a track 32 and permit reciprocation of the carrier toward and away from the main console. The secondary console 28 is shown in its normal position allowing patient access to the platform 24 but, upon movement of secondary console 28 toward the primary console 20 by means to be described hereinafter, the patient is brought into operative association with a pair of measuring structures 34 which extend horizontally outwardly from console 20.

Turning now particularly to FIGS. 3 and 4 for views of the interior of the main console 20, it may be seen that the latter includes a base 36, opposed side walls 38, a rear wall 40, a front wall 42, and a top 43. Vertical and horizontal angle members 44 form a framework which supports walls 38, 40 and 42 and the mechanisms within the console to be described hereinafter. Only a portion of the members 44 utilized in the construction of console 20 is illustrated, the remainder being omitted for clarity. A horizontally disposed, rectangular framework 46 is supported by members 44 and located in spaced relationship to base 36 at a distance therefrom of approximately one-third the height of console 20. Framework 46 carries a U-shaped member 48 which serves as a mount for a prime mover 50 and its associated transmission 52.

An upstanding, elongated screw 54 forms the output shaft of transmission 52 and is journalled by any suitable means (not shown) on the underside of top 43. Additionally, a vertical guide 56 extends in parallel relationship to screw 54 and is spaced forwardly therefrom between screw 54 and front wall 42. A horizontally U-shaped bracket 58 is attached to a roller assembly 60 comprising three rollers which are in engagement with guide 56. As is clear in FIG. 3, one of the rollers of assembly 60 is disposed between screw 54 and guide 56, while the other two rollers are disposed in opposed relationship to one another and engage opposite, lateral sides of guides 56. Bracket 58 includes an upstanding plate 59 which extends beneath roller assembly 60, as may be seen in FIG. 4, and mounts a roller assembly 61 having a pair of opposed rollers which engage opposite, lateral sides of guide 56.

A pair of carriages 62 support respective structures 34 and are laterally spaced from screw 54 on opposed sides thereof. Carriages 62 are interconnected by a strap or link 64 provided with a central, upstanding sleeve 66 defining an internally threaded bore which receives screw 54. Particularly in FIG. 5, it may be seen that each end of link 64 is coupled with the corresponding carriage 62 by a lost motion connection 68 in the form of a bracket defining a vertically extending slot 70 receiving the associated end of link 64.

A vertical guide 72 is associated with each of the carriages 62 and receives upper and lower roller assemblies 74 and 76, respectively, mounted on the respective carriage. Each of the upper roller assemblies 74 comprises a pair of opposed rollers, while each lower assembly 76 utilizes three rollers in engagement with the associated vertical guide 72.

Each carriage 62 includes a main, L-shaped plate 78, one leg of which extends laterally of console 20 and in parallelism with front and rear walls 42 and 40, the other leg of each plate 78 extending rearwardly in relatively closely spaced, parallel relationship to the associated side wall 38. The roller assemblies 74 and 76 are mounted on the rearwardly extending legs of each plate 78, which also serve as a mount for a prime mover 80 and its transmission 82. Each prime mover 80 and associated transmission 82 is secured to the corresponding plate 78 by a bracket 84 which is permitted limited horizontal movement with respect to plate 78, for purposes to be explained hereinafter. An L-shaped extension 86 projects rearwardly from the rearmost extremity of each plate 78, respectively, and serves as a mount for a kill switch 88 and a spring 90 which is compressed between the housing of the corresponding transmission 82 and extension 86.

Each of the measuring structures 34 includes a horizontally reciprocable arm or bar 92 which is received by a horizontal guide 94 extending forwardly from plate 78 of the respective carriage 62. Each guide 94 includes a pair of upright plates 96 which mount two pairs of vertically opposed rollers 98. In FIG. 3, only the upper roller 98 of each pair is visible, each arm 92 being received between the two vertically spaced rollers 98 of each of the two pairs associated with the corresponding guide 94. The rearmost extremity of each arm 92 is internally longitudinally threaded to receive the output shaft 100 extending from the associated transmission 82. The shafts 100 are externally threaded to mate with the internal threads of arms 92.

From the foregoing it is apparent that, as screw 54 rotates, link 64 will rise or fall depending on the direction of rotation of screw 54. This, in turn, carries bracket 58 and carriages 62 upwardly or downwardly. Once carriages 62 are disposed at the desired height, the lost motion connections 68 permit manual movement of the carriages through a displacement of several inches. In order to maintain each carriage 62 at the proper height when it is moved within the confines of its lost motion connection to a desired elevation and then released, a counterweight 102 is connected to each carriage 62 respectively by a cable 104 which is trained over a pair of pulleys 106 mounted beneath top 43 and adjacent thereto.

Relative vertical displacement of the two structures 34 is indicated by electromechanical apparatus, the mechanical components of which include a rotatable shaft 108 journalled in bracket 58, a pair of grooved wheels 110 and 112 mounted on the ends of shaft 108, and a ring gear 114 adjacent wheel 112 and fixed to that end of shaft 108. Wheel 112 is rotatable with respect to shaft 108 and turns freely thereon, while wheel 110 is rigid with shaft 108. Wheel 112 carries a potentiometer 116 having a rotatable stem 118. A pinion 120 is rigid with stem 118 and disposed in engagement with ring gear 114, pinion 120 being driven by gear 114 as the latter rotates with shaft 108. A stop member 122 is rigid with shaft 108 between gear 114 and wheel 112 and extends radially therefrom as is clear in FIG. 5.

Stop member 122 is provided with a pair of spaced-apart, radially extending projections 124 which are disposed for engagement by a pin 126 carried by wheel 112. A spring 128 is connected to wheel 112 by a flexible lead 130 which is coiled about the hub of the wheel. In similar fashion, a spring (not shown) is coupled to wheel 110 by a flexible lead 132 coiled about the hub thereof. These springs bias their associated wheels in a counterclockwise direction as viewed in FIG. 5.

A cable 134 is seated in the peripheral groove of wheel 112 and is connected to the adjacent carriage 62. A cable 136 is seated in the peripheral groove of wheel 110 and is connected to the other carriage 62. Cables 134 and 136 are wound on their respective wheels to cause clockwise movement thereof, as viewed in FIG. 5, during upward movement of carriages 62 within the confines of their lost motion connections 68. Thus, when the carriages are lowered with respect to bracket 58 and move downwardly within their lost motion connections, spring 128 and the spring (not shown) connected to wheel 110 cause counterclockwise movement of wheels 110 and 112 to retract cables 136 and 134. Normally, when the two carriages are both disposed either at the upper limit or lower limit of their lost motion connections 68, pin 126 is disposed intermediate projections 124 as illustrated in FIG. 5. This positional relationship also prevails when the two carriages are shifted within the lost motion connections but are maintained at the same height relative to one another.

Figure 11:
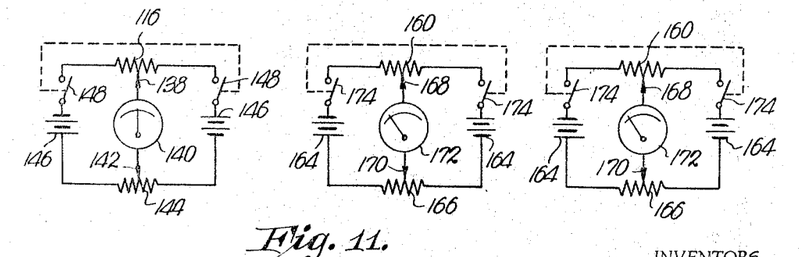
FIG. 11 comprises three electrical schematic diagrams showing the indicating meters and their associated circuitry.

Referring to FIG. 11, potentiometer 116 is illustrated schematically and is shown provided with a shiftable wiper or tap 138. Wiper 138 is attached to stem 118 for rotation therewith as in conventional potentiometer construction. A voltmeter 140 is connected between wiper 138 and the variable tap 142 of a variable resistance 144. Potentiometer 116 and resistance 144 are connected in a series loop with a pair of D.C. sources 146. Sources 146 are polarized in series-aiding relationship in the loop so that, when the variable taps 138 and 142 of resistances 116 and 144 are set at their midpoints, no potential difference will exist between taps 138 and 142. Thus, when resistances 116 and 144 are each divided into a pair of resistances of equal ohmic value, voltmeter 140 will read zero. Preferably, voltmeter 140 is of the type wherein the zero volts indication is at the center of the dial. Resistance 144 is employed as a zero adjust prior to manipulation of measuring structures 34, a pair of ganged "on"-"off" switches 148 being employed to disconnect sources 146 from the circuit during nonuse of the apparatus.

Horizontal motion of each structure 34 is metered by an identical electromechanical arrangement. Each arm 92 has a tie post 150 extending laterally inwardly of console 20. A grooved wheel 152 is rigid with a vertical shaft 154 journalled on a bracket assembly 156 which projects rearwardly from each plate 78. Referring to the right-hand carriage 62 as viewed in FIG. 4, it may be seen that a coil spring 158 surrounds the shaft 154 between wheel 152 and the top of bracket assembly 156.

A potentiometer 160 is attached to the base portion of bracket assembly 156, and its rotatable, resistance adjusting stem (not shown) is rigidly secured to shaft 154. Spring 158 normally biases wheel 152 in a clockwise direction, as viewed in FIG. 3, wheel 152 being interconnected with post 150 by a cable 162 which is received by the groove of wheel 152 and secured therein. A like structural arrangement exists for the horizontal motion indicating mechanism mounted on the left-hand carriage 62, except that the components are arranged in inverted relationship with respect to the parts just described associated with the right-hand carriage 62. Manifestly therefore, spring 158 carried by the left-hand carriage 62 biases its associated wheel 152 in a counterclockwise direction, as viewed in FIG. 3.

Referring to FIG. 11, potentiometers 160 are illustrated in their respective circuits, which are identical. Each circuit employs a pair of DC sources 164 coupled in series-aiding relationship in a series loop with the associated potentiometer 160 and a variable resistance 166. The wiper or tap of each potentiometer 160 is illustrated at 168, such wiper conventionally being fixed to the rotatable stem of the potentiometer for movement therewith as the stem is rotated. Resistance 166 is also provided with a shiftable tap 170, a voltmeter 172 being connected across taps 168 and 170. Thus, the circuit associated with each of the potentiometers 160 operates in an analogous fashion to that as described heretofore for potentiometer 116 in its circuit, the only exception being that the meters 172 are preferably of the type which indicate zero voltage at one end of their scales. Each of the resistances 166 is utilized as a zero adjust for aligning the two circuits in a manner to be described hereinafter. A pair of ganged "on"-"off" switches 174 are coupled in each circuit for disabling the latter during nonuse of the apparatus.

A prime mover 176 and its associated transmission 178 are mounted adjacent base 36, the externally threaded output shaft 180 of transmission 178 extending forwardly into threaded engagement with a nut 182 secured to the underside of carrier 22. This may be seen in FIGS. 3 and 6. A rectangular opening 184 in front wall 42 of console 20 receives the end of carrier 22 remote from the secondary console 28 and permits reciprocation of the carrier along tracks 32 to move rest 26 toward and away from front wall 42 as threaded shaft 180 is driven by prime mover 176. The various prime movers 50, 80 and 176 may take the form of reversible DC motors; therefore, an inverter unit 186 is illustrated adjacent prime mover 176 and supported by base 36 for providing direct current for the electric motors from an available alternating current source.

The patient-receiving, platform portion 24 of carrier 22 is provided with an upstanding divider 88 which splits the platform into two sections, one for each of the patient's feet. The patient stands on platform 24 with his back and buttocks against rest 26 and, therefore, faces front wall 42 of console 20. The right foot rests on a heel-supporting element 190 in the form of a flat plate, the arch of the right foot overlying a circular, arch-supporting element 192. Element 192 is received by a circular opening in a horizontally reciprocable plate 194 which rides in a slot 196 in platform 24. On the underside of platform 24, as shown in FIG. 6, a pair of plates 198 and 200 underlie slot 196 to thereby form a track or guide for plate 194. Thus, plate 194 is contained between the longitudinal margins of slot 196 and rests upon the upper surfaces of the adjacent longitudinal edges of plates 198 and 200.

In similar fashion, the left heel of the patient rests on a heel-supporting element 202, while the arch of the left foot overlies an arch-supporting element 204. Again, element 204 is received in a circular opening in a horizontally reciprocable plate 206 which rides in a slot 208 in platform 24. The structure of these various components associated with the patient's left foot is identical to that as described above for the right foot supports, the exception being that an additional plate 210 is attached to the underside of platform 24 in the same relative position to plate 200 as plate 198, thereby forming the track or guide upon which plate 206 rides.

Figure 10:
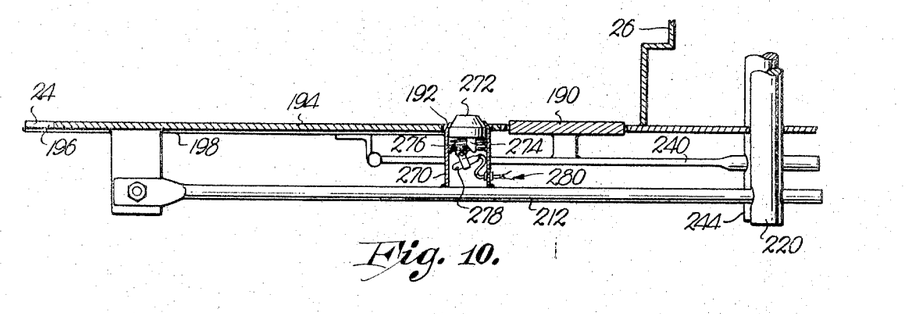
FIG. 10 is a vertical, sectional view through the platform of the carrier, the components there shown being illustrated schematically.

In FIG. 6 means for vertically shifting elements 190, 192, 202 and 204 is illustrated. Additionally, FIG. 10 is a schematic representation showing elements 190 and 192 and associated components. Arch-supporting elements 192 and 204 rest on and are secured to rods 212 and 214, respectively. The ends of these rods remote from the secondary console 28 are pivotally attached to plates 194 and 206, respectively. Opposed, elongated operating handles 216 extend laterally outwardly from the connections of rods 212 and 214 with the corresponding plates, handles 216 projecting through horizontally extending slots 218 in the side walls of carrier 22. In this manner, means is provided for manually shifting each of the plates 194 and 206 along slots 196 and 208 to a position which locates arch-supporting elements 192 and 204 in proper spaced relationship to heel elements 190 and 202. In this manner, the arch-supporting elements may be adjusted for the size of the patient's feet.

During movement of plates 194 and 206 as aforesaid, rods 212 and 214 slide in transverse openings through upright sleeves 220 and 222, respectively. Sleeves 220 and 222 are disposed within console 28 adjacent the base thereof and extend through platform 24 as shown in FIG. 7, and are internally longitudinally threaded to receive externally threaded shafts 224 and 226, respectively. These shafts form a part of linkage structures 228 and 230 which are connected with the outputs of transmissions 232 and 234 of prime movers 236 and 238 respectively.

Heel-supporting elements 190 and 202 rest on and are secured to a pair of irregularly-shaped rods 240 and 242 respectively. The ends of rods 240 and 242 remote from console 28 are journalled to the underside of platform 24 and mount these rods for swinging movement about horizontal axes extending laterally of carrier 22 and parallel to the axes of swinging movement of rods 212 and 214. Thus, movement of rods 240 and 242 will elevate elements 190 and 202 with respect to platform 24 to adjust the heights of the patient's heels.

The ends of rods 240 and 242 underlying console 28 are slidably received in transverse openings through a pair of upstanding sleeves 244 and 246, respectively. As is clear in FIG. 7, sleeves 244 and 246 are disposed adjacent sleeves 220 and 222 and are of like construction. Linkages 248 and 250 include externally threaded shafts 252 and 254 which are threadably received in sleeves 244 and 246 and drive the latter in vertical directions upon rotation thereof. Linkages 248 and 250 are coupled with transmissions 256 and 258 which transmit rotational motion thereto from prime movers 260 and 262, respectively.

Four L-shaped rods 264 have upstanding legs which extend through apertures in platform 24, and horizontal legs which are operably coupled with respective elements 190, 192, 202 and 204. The horizontal legs of these rods are slidably received by lateral projections 266 which extend from rods 212, 214, 240 and 242 at the points of connection of such rods with the four heel and arch supporting elements. Although the movements of these elements will be slightly arcuate, the displacements involved and the lengths of the four pivot rods are relatively long; therefore, movement of the heel and arch-supporting elements will be vertically linear for all practical purposes. Thus, the L-shaped rods 264 sense the degree of displacement of the four elements and indicate such displacements on four dials 268 having vertically extending scales, one dial corresponding to each element respectively. The pointers 269 of dials 268 are rigid with respective rods 264 and extend laterally from the upper extremities thereof. Therefore, each pointer 269 shifts vertically upon movement of the corresponding rod to register its displacement on the scale of the associated dial 268.

FIG. 10 illustrates diagrammatically the heel and arch-supporting elements 190 and 192 and their associated components. These elements are shown elevated above the level of platform 24, representing possible positions thereof necessary to correct misalignment of the patient's bone structure during operation of the apparatus. It should be noted that the arch-supporting element 192 comprises an upstanding, cylindrical housing or case 270, the base of which is rigid with rod 212.

The upper extremity of housing 270 is reduced in diameter to maintain a conical button 272 within housing 270. Button 272 has a downwardly extending actuator stem 274 rigid therewith, button 272 being yieldably biased upwardly against the upper extremity of housing 270 by a spring 276. A mercury switch 278 is pivotally mounted beneath button 272 in disposition for engagement by stem 274 upon downward movement of button 272 by contact of the latter with the arch of a patient. Leads 280 extend from switch 278 to an indicator lamp 282 on the top of console 28. An electrical power source (not shown) is interposed in leads 280 so that switch 278 is made to control the energization of lamp 282. Switch 278 is shown in its "off" position, movement to the "on" position being effected by downward movement of stem 274 in the manner as aforesaid. Another incandescent lamp 284 is also disposed on the top of console 28, this lamp being responsive to arch-supporting element 204 and its associated components. It should be understood that the internal components of element 204 are identical to that as shown and described for element 192.

Referring particularly to FIG. 3, it may be seen that the arms 92 of measuring structures 34 are each provided with a J-shaped rod 286 having a contact tip 288 which is adapted for engagement with the patient under treatment. Rods 286 are adjustable on respective arms 92 and may be moved horizontally toward and away from one another to accommodate the size of the particular patient under treatment. Fastener 290 may be manually operated to release rods 286 and tighten the same upon movement to the desired disposition. In the preferred use of structures 34, tips 288 are placed in engagement with the notches below the anterior-superior crests of the ilia.

FIGURES 8 and 9 show an attachment for use in lieu of rods 286. Only one of the arms 92 is employed when this attachment is utilized. The attachment comprises an angle-measuring device 292 provided with a scale 294 and a pair of angle-forming members 296 and 298. Member 296 extends horizontally laterally toward the patient, its free extremity being adapted for contact with the notch below the anterior-superior crest of the ilium. Member 298 comprises an L-shaped rod 300 releasably secured to an elongated plate 302 by an adjustable fastener 304.

Rod 300 is shiftable longitudinally of plate 302 in an elongated slot 306 in the plate, the downwardly extending portion 308 of the L-shaped rod 300 being maintained in alignment with slot 306 regardless of the position of rod 300, as is clear in FIG. 8. Member 296 may be longitudinally shifted by pushing or pulling a knob 310 connected thereto to supplement the adjustable fastener 290 which secures the attachment to arm 92. Attachment 292 is joined to the arm 92 by an L-shaped leg 312 which forms a part of the attachment and renders the same interchangeable with either of the J-shaped rods 286. Leg 312 also serves to mount member 298 for swinging movement with respect to scale 294 about a normally horizontal axis extending longitudinally of member 296. A friction fit may be employed to permit movement of member 298 and yet maintain the same in position without operator attention. During utilization of the attachment, the tip of portion 308 of rod 300 is especially adapted for contact with the first sacrotubercle at the same time that the tip of member 296 is in contact with the notch below the anterior-superior crest of the ilium.

*Apparatus control*

It should be noted that the meters 140 and 172 are mounted on an inclined panel portion 314 of console 20 where they may be viewed by both the patient and the operator. The knobs illustrated on panel 314 are for the purpose of shifting the variable taps 142 and 170 associated with resistances 144 and 166 shown in FIG. 11. In this manner, the dials of the meters may be conveniently adjusted to the zero setting. In this regard, it should be understood that meter 140, which indicates the superior-inferior difference of structures 34, is zeroed with structures 34 disposed at either the upper or lower limits of their respective lost motion connection 68. Thus, it is assured that structures 34 are at the same elevation when meter 140 is zeroed.

Similarly, each of the meters 172 is zeroed with structures 34 extending from front wall 42 the same distance. This may conveniently be achieved by placing an index mark 316 on each arm 92 which may be visually aligned with the front surface of wall 42. It should be understood, however, that the measuring apparatus of the instant invention is concerned with relative movement of the two structures 34 with respect to one another from a predetermined, normally relative disposition that is indicative of proper alignment of the bone structure under measurement. Thus, should it be desired to determine the degree of misalignment of skeletal features other than those specifically discussed herein, which features are properly misaligned a certain degree rather than normally in alignment, then certainly the zero settings of the various meters would be adjusted with structures 34 in relative positions other than those just above mentioned.

FIGURE 12 illustrates an exemplary control circuit for use with any of the prime movers 50, 80, 176, 236, 238, 260 and 262. As mentioned above, these prime movers may take the form of reversible direct current electric motors, a prime mover of this type being designated M in FIG. 12. A DC source 318 operates motor M, which is controlled by a pair of ganged, single-pole, double-throw switches 320 having a normal "off" position as illustrated. It will be appreciated that when the movable poles of switches 320 are in engagement with their associated upper contacts, current will flow through motor M in one direction, while engagement with the lower contacts will cause current flow in the opposite direction. One of these circuits of FIG. 12 is employed with each electric motor.

A bank 322 of four finger-operated switch controls is mounted on panel 314 for actuating the various switches 320 which control two prime movers 80 and prime movers 50 and 176. These motors control the horizontal movement of structures 34, the vertical movement of structures 34, and the horizontal movement of carrier 22, respectively. Another bank 324 of four finger-operated switch controls is mounted on the top of console 28 between the two lamps 282 and 284. Bank 324 controls the four prime movers 236, 238, 260 and 262 contained within the housing of console 28. Therefore, the elevations of the heel and arch-supporting elements are controlled by the operator from the secondary console.

*Operation*

The meters 140 and 172 are zeroed in the manner described above and control bank 324 is manipulated so that the pointers of the four dials 268 register zero. At this point the heel and arch-supporting elements 190, 192, 202 and 204 are flush with the top surface of platform 24. The patient then stands on platform 24 with his shoes removed and with one foot on each side of divider 188, the buttocks and back being against rest 26. Motors 236 and 238 are then operated to drive arch-supporting elements 192 and 204 upwardly until the same contact the patient's arches. Manifestly, handles 216 have been operated to shift plates 194 and 206 to accommodate the size of the patient's feet.

As each of the arch-supporting elements 192 and 204 comes into contact with the underside of the patient's foot, the associated lamp 282 or 284 is energized. As lamps 282 and 284 become energized, the operator ceases operation of the corresponding motor 236 or 238 so that the arch-supporting elements are stopped at elevations contacting, but not raising, the patient's arches. The operator may then read the two center dials 268 to determine whether or not the patient's arches are initially at the same elevation. If a difference in arch rise is indicated, this may be corrected by raising the lower arch until both arches are even prior to further operation of the apparatus.

Assuming first that the alignment of the ilia is desired to be checked, structures 34 are utilized and the patient is advanced toward the main console 20 by operation of motor 176. Carrier 22 moves along tracks 32 upon rotation of the threaded shaft 180 until the patient is in close proximity to tips 288. Operation of motor 176 is then ceased.

It is now necessary to position structures 34 so that tips 288 are in contact with respective notches below the anterior-superior crest of the ilio. This is done by further manipulation of the controls of bank 322 to shift structures 34 to the approximate elevation necessary for contact. This necessitates operation of motor 50 which moves carriages 62 upwardly or downwardly as required by rotation of screw 54 in the proper sense.

The switch controls of bank 322 are now manipulated to shift structures 34 horizontally outwardly away from console 20 and toward the patient. The two motors 80 effect this movement through rotation of shafts 100 which are threadably received by arms 92. Finally, structures 34 are manually adjusted in vertical directions within the confines of lost motion connections 68 to bring tips 288 into precise contact with the notches. Obviously, this sequence may be altered as necessary to obtain proper contact.

The two voltmeters 172 and the voltmeter 140 will now indicate any deviation of the two notches from the proper relative positions thereof. Meters 172 indicate the number of millimeters or other units of displacement that structures 34 moved in order to effect contact with the notches. If these two readings of meters 172 are the same, then no anterior-posterior difference exists between the two notches. Conversely, a difference in the readings indicates that one notch is located forwardly or rearwardly with respect to the other.

Similarly, meter 140 indicates any superior-inferior difference between the two notches. Potentiometer 116 is connected in its circuitry so that the movement of wiper 138 will cause movement of the hand of meter 140 to the left of center if the left notch is below the right notch, and to the right of center if the right notch is below the left. Wiper 138 is independently controlled both by rotation of shaft 108 and by rotation of grooved wheel 112. In the former instance, pinion 120 is rotated by ring gear 114 to shift the wiper, while in the latter case the housing of potentiometer 116 secured to wheel 112 is itself shifted causing pinion 120 to orbit with respect to ring gear 114.

If misalignment of the notches is indicated, correction is effected through the use of the arch and heel-supporting elements 190, 192, 202 and 204. By way of example, if it is found that the right ilium is disposed forwardly of the left ilium, arch-supporting element 192 is raised to move the right ilium back and effect proper alignment. Furthermore, assuming that the right ilium is also disposed at a higher elevation than the left, then the arch and heel-supporting elements 204 and 202 will be raised accordingly to compensate for the superior-inferior difference. Once these corrections are made and meter 140 and the two meters 172 indicate zero deviation, the heights of the patient's arches and heels relative to platform 24 may be read from dials 268. Thus, the proper thicknesses of corrective arch pads or heel lifts for the patient's shoes may be selected, taking into consideration the initial arch elevation indicated at the outset.

In the event that it is desired to measure the degree of pelvic angulation of the patient, rod 286 is removed from the left-hand arm 92 and leg 312 of attachment 292 inserted in its place. The operating procedure is then substantially the same as above discussed, except that the attachment is manipulated in a manner to effect contact of the free end of member 296 with the notch below the anterior-superior crest of the left illium, while the end of portion 308 of member 298 is brought into contact with the first sacrotubercle. The horizontal and vertical controls for the movement of arm 92 to which the attachment is fixed are operated to effect necessary horizontal and vertical shifting of the attachment, but the meters 140 and 172 associated therewith are not employed in this mode of operation. Instead, scale 294 is utilized for the measuring function, member 298 being rotated about an axis extending longitudinally through member 296 until proper contact with the first sacrotubercle is achieved. The angle from the horizontal should be approximately 38° to 40° if the patient possesses the proper pelvic angulation.

In correcting any misalignment or malpositioning of the bone structure determined by attachment 292, the arch-supporting elements 192 and 204 are shifted simultaneously, as are the heel-supporting elements 190 and 202. Of course, it may be necessary to first properly align the patient's arches prior to measuring as discussed hereinabove; but, in any event, after such preliminary alignment the arch-supporting elements 192 and 204 are moved in equal displacements from the preliminary setting.

If it is found that the angle measured by device 292 is less than 38°, the heel-supporting elements 190 and 202 are elevated together to increase the angle. Conversely, a measurement of greater than 40° necessitates elevation of arch elements 192 and 204 to decrease the angle. As before, dials 268 will register the elevations of the elements above platform 24, from which the thicknesses of the corrective heel and arch supports may be readily determined.

As a safety feature, brackets 84 supporting respective motors and transmissions 80 and 82 are attached to plates 78 in a manner to permit limited horizontal movement thereof with respect to the plates. This is shown in FIG. 3 for the bracket 84 associated with the left measuring structure 34, where it may be seen that a slot 85 is provided in plate 78, permitting horizontal movement of bolt 87 which, in turn, attaches bracket 84 to the plate. Spring 90 biases the assembly rightwardly as viewed in FIG. 3 and maintains the same in the position shown until pressure is brought to bear on structure 34. This causes bracket 84 and bolt 87, and hence, arm 92 of structure 34, to shift rearwardly compressing spring 90 and engaging the housing of transmission 82 with the actuator arm 88a of kill switch 88. The latter would be placed in series to the circuit to the respective motor 80. Thus, if either of the tips 288 is brought into engagement with the patient under excessive force, the associated spring 90 yields, relieving the pressure on the patient and actuating switch 88 to cease motor operation.

Having thus described the invention, what is claimed as new and desired to be secured by Letters Patent is:

1. Therapeutic apparatus including:
a horizontal platform for receiving a patient under treatment in standing position;
a pair of measuring structures each having a contact tip for engaging a selected skeletal feature of the patient;
means mounting said structures adjacent said platform for movement of each structure along orthogonal paths of travel, toward and away from the patient and along the patient's length when the patient is standing on the platform, whereby to bring the tips into contact with said features; and
means responsive to movement of said structures for indicating the degree of relative movement of the structures away from a predetermined, normal relative disposition corresponding to proper alignment of said selected skeletal features, whereby misalignment of said selected skeletal features is indicated if relative movement of said structures away from said normal relative disposition is required to bring said tips into contact with said features.

2. The invention of claim 1, wherein is provided means mounting said platform for movement toward said structures from an initial position, spaced from the structures a distance sufficient to locate the patient clear of the structures to a final position where the patient may be contacted by said tips.

3. The invention of claim 1, said platform having vertically reciprocable supporting elements therein disposed for engagement with the arches and heels of said patient to properly align said selected skeletal features, and wherein is provided selectively operable means coupled with said elements for individually shifting the latter to any one of a number of elevated positions relative to said platform, whereby to compensate for any misalignment indicated.

4. The invention of claim 1, wherein each of said structures includes an arm, and said mounting means mounts said arms in spaced relationship to each other for reciprocal movement of each of said arms independently in opposed directions extending substantially parallel to said platform, and in opposed directions extending substantially perpendicular to said platform.

5. The invention of claim 1, wherein said indicating means includes electrical power source means, a variable electrical impedance, means intercoupling one of said structures and said impedance for effecting variation of the latter upon movement of said one structure, an electrical meter responsive to current flow therethrough for indicating the presence of said flow, and circuit means operably intercoupling said source means, said impedance, and said meter in a manner to provide variation in current flow through the latter in response to movement of said one structure.

6. Therapeutic apparatus including:
a horizontal platform for receiving a patient in standing position, and provided with an upstanding rest;
upstanding support means spaced from said platform remote from the rest;
a pair of measuring structures for contacting selected skeletal features of the patient;
a carriage for each of said structures, respectively, mounted on said support means for vertical reciprocation, each of said carriages including a guide receiving the respective structure for reciprocal movement thereof with respect to the carriage along a path of travel extending substantially parallel to said platform and toward said rest; and
means coupled with said structures and responsive to movement thereof for indicating the degree of relative movement of the structures away from a predetermined, normal relative disposition corresponding to proper alignment of said selected skeletal features, whereby misalignment of said selected skeletal features is indicated if relative movement of said structures away from said normal relative disposition is required to bring said structures into contact with said features.

7. The invention of claim 6, wherein said platform has four vertically reciprocable supporting elements therein disposed for engagement with the arches and heels of said patient to properly align said selected skeletal features, and wherein is provided selectively operable power means for each of said elements respectively, coupled with its associated element for shifting the latter to any one of a number of elevated positions relative to said platform, whereby to compensate for any misalignment of said features revealed by said indicating means, a linkage between each of said power means and the corresponding element for transmitting substantially linear motion to the latter, and means coupled with each of said linkages respectively for registering the amount of displacement of the associated element above said platform.

8. The invention of claim 6, wherein said carriages are spaced apart, said support means including a vertical guide between the carriages and wherein is provided a link intercoupling the carriages and shiftable along the last-mentioned guide, and drive means coupled with the like for reciprocating the latter, and hence said carriages, along said last-mentioned guide, a lost-motion connection between each of said carriages respectively and said link, permitting manual movement of each of said structures to a desired vertical position after power movement of the structures to the appropriate height necessary for properly contacting the structures with said features of the patient, and a counterweight coupled with each of said carriages respectively for maintaining the associated structure in said desired vertical position.

9. The invention of claim 8, wherein said indicating means includes a bracket carried by said link; a shaft journalled on the bracket; means intercoupling one of said carriages and said shaft for effecting a predetermined angular displacement thereof in one rotational direction upon movement of said one carriage in one vertical direction a predetermined distance; a rotatable device on said shaft, coupled with the other carriage, and rotatable with respect to the shaft in said one rotational direction and through said predetermined displacement in response to movement of said other carriage said predetermined distance in said one vertical direction; a ring gear rigid with said shaft and disposed adjacent said device; a potentiometer mounted on said device and having a wiper an a rotatable stem coupled with the wiper for shifting the latter; a pinion rigid with the stem and engaging said gear, whereby movement of both of said carriages in said one vertical direction an equal amount causes no change in the setting of the wiper; electrical power source means; electrical meter means responsive to current flow therethrough for indicating the presence of said flow; and circuit means operably intercoupling said potentiometer, said source means, and said meter means in a manner to provide variation in current flow through the latter in response to movement of said wiper.

10. Therapeutic apparatus including:
a horizontal platform for receiving a patient in standing position;
upstanding support means spaced from said platform;
measuring means for contacting selected skeletal features of the patient and for detecting any deviation of said features from the proper positions thereof;
means mounting said measuring means on said support means in disposition extending in vertically spaced relationship to said platform for movement toward and away from the platform,
said platform having vertically reciprocable supporting elements therein disposed for engagement with the arches and heels of said patient; and
selectively operable means coupled with said elements for individually shifting the latter to any one of a number of elevated positions relative to said platform, whereby the positions of said selected skeletal features may be changed while the patient is standing on the platform to compensate for any deviation from the proper positions thereof detected by said measuring means.

11. The invention of claim 10, wherein said measuring means includes an angle measuring device for detecting the angular relationship between said selected features.

12. The invention of claim 11, wherein said device is provided with a pair of angle-forming members, the first of the latter being adapted for contact with anterior bone structure of said patient, the second member being adapted for contact with posterior bone structure of the patient.

13. The invention of claim 12, wherein said device includes means mounting one of said members for swinging movement along a path of travel which varies its angular relationship with the other member, whereby to permit adjustment of the angular relationship of the two members to bring the latter into contact with said anterior and posterior bone structures.

14. The invention of claim 10, wherein is provided means mounting said platform for movement from an initial position, spaced from the measuring means a distance sufficient to locate the patient clear of the measuring means, toward said support means to a final position where the patient may be contacted by said measuring means.

15. The invention of claim 10, wherein is provided means responsive to movement of said elements for registering the amount of displacement during upward movement thereof to effect proper positioning of said selected skeletal features, whereby the data thus obtained may be used to prepare corrective arch and heel supports for the shoes of the patient.

16. The invention of claim 10, wherein two of the elements are adapted for arch engagement and each have means for sensing initial contact with the respective arch, and wherein is provided means responsive to each sensing means for indicating the occurrence of said initial contact of each of said two elements, and means responsive to movement of said two elements for registering the amount of displacement during upward movement thereof, whereby any variation in the two arches of the patient will be shown by the registering means at the time said initial contacts are indicated to thereby permit the variation to be corrected prior to determining malpositioning of said features.

References Cited
UNITED STATES PATENTS

| 2,111,648 | 3/1938 | Stone | 37—174 |
| 2,795,953 | 5/1957 | Makowsky | 73—172 |
| 3,156,110 | 10/1964 | Clynes | 73—67.8 |
| 3,270,558 | 9/1966 | Barrel et al. | 73—172 |

FOREIGN PATENTS

| 672,253 | 2/1939 | Germany. |
| 172,972 | 12/1933 | Switzerland. |

RICHARD A. GAUDET, *Primary Examiner.*

SIMON BRODER, *Examiner.*